(12) United States Patent
McAdams et al.

(10) Patent No.: US 10,477,835 B2
(45) Date of Patent: Nov. 19, 2019

(54) FEEDING APPARATUS FOR ANIMALS

(71) Applicant: Crystal Spring Colony Farms Ltd., Ste. Agathe (CA)

(72) Inventors: Tom McAdams, Ste. Agathe (CA); Ethan Hofer, Ste. Agathe (CA); Lucien Dnestrianschii, St. Albert (CA)

(73) Assignee: Crystal Spring Colony Farms Ltd., Ste. Agathe, MB (CA)

( * ) Notice: Subject to any disclaimer, the term of this patent is extended or adjusted under 35 U.S.C. 154(b) by 311 days.

(21) Appl. No.: 15/239,177

(22) Filed: Aug. 17, 2016

(65) Prior Publication Data
US 2018/0049405 A1  Feb. 22, 2018

(51) Int. Cl.
| | |
|---|---|
| *A01K 5/02* | (2006.01) |
| *B01F 15/02* | (2006.01) |
| *B01F 7/00* | (2006.01) |
| *B01F 5/04* | (2006.01) |
| *B01F 15/04* | (2006.01) |
| *B01F 3/12* | (2006.01) |
| *B01F 3/18* | (2006.01) |

(52) U.S. Cl.
CPC .......... *A01K 5/0225* (2013.01); *A01K 5/0216* (2013.01); *A01K 5/0275* (2013.01); *B01F 3/12* (2013.01); *B01F 3/18* (2013.01); *B01F 5/0471* (2013.01); *B01F 7/0025* (2013.01); *B01F 15/0216* (2013.01); *B01F 15/0235* (2013.01); *B01F 15/0245* (2013.01); *B01F 15/0416* (2013.01); *B01F 2215/0008* (2013.01)

(58) Field of Classification Search
CPC .. A01K 5/0216; A01K 5/0225; A01K 5/0275; A01K 39/012; F03B 15/02; F03B 15/04; F03B 15/06; B01F 15/0235; B01F 5/0471; B01F 7/0025; B01F 15/0216; B01F 15/0245; B01F 15/047; B01F 15/0416
USPC .......................................................... 119/53
See application file for complete search history.

(56) References Cited

U.S. PATENT DOCUMENTS

| | | | | | |
|---|---|---|---|---|---|
| 1,226,108 | A | * | 5/1917 | Olney .................. | B67D 1/0004 222/132 |
| 1,387,997 | A | * | 8/1921 | Page .................... | A01K 5/0233 119/54 |
| 2,098,618 | A | * | 11/1937 | Dostert .................... | A01C 1/08 137/99 |

(Continued)

*Primary Examiner* — Tien Q Dinh
*Assistant Examiner* — Ebony E Evans
(74) *Attorney, Agent, or Firm* — Adrian D. Battison; Ade & Company Inc.; Kyle R. Satterthwaite (57) ABSTRACT

In an apparatus for feeding animals including one or more feed dispensing containers from which the animals can take feed which are fed by supply ducts from a supply a device is provided which includes a feed supply duct portion arranged such that the feed falls through the feed supply duct portion under gravity. A drive member is mounted at the duct and includes a plurality of paddle blades of a wheel mounted for rotation about an axis of the wheel such that falling feed in the duct acts to drive the blades to rotate the wheel about the axis and a driven component driven by the wheel. The driven component is in most cases a dispenser for feeding a liquid or particulate additive material from a supply cartridge, which is mounted on a common housing forming the duct and containing the wheel, to an injection opening on the bottom of the housing for addition to the feed passing through the duct portion.

10 Claims, 11 Drawing Sheets

(56) References Cited

U.S. PATENT DOCUMENTS

| | | | | |
|---|---|---|---|---|
| 3,387,829 | A * | 6/1968 | Nangoh | B01F 3/18 |
| | | | | 366/37 |
| 3,598,087 | A * | 8/1971 | Ramser | A01K 39/0125 |
| | | | | 119/51.11 |
| 4,185,653 | A * | 1/1980 | Armstrong | B01F 5/0471 |
| | | | | 137/114 |
| 4,246,753 | A * | 1/1981 | Redmond | F03B 13/00 |
| | | | | 290/43 |
| 4,488,055 | A * | 12/1984 | Toyama | F03B 13/08 |
| | | | | 290/42 |
| 4,699,049 | A * | 10/1987 | Mizer | A23N 5/00 |
| | | | | 99/568 |
| 6,082,300 | A * | 7/2000 | Futch | A01K 5/02 |
| | | | | 119/51.11 |
| 7,121,495 | B2 * | 10/2006 | Caamano | B65H 75/4478 |
| | | | | 242/390.5 |
| 8,656,862 | B2 * | 2/2014 | Manickchan et al. | |
| | | | | A01K 39/012 |
| | | | | 119/51.01 |
| 8,770,915 | B2 * | 7/2014 | Lim | F03B 13/00 |
| | | | | 415/3.1 |
| 9,766,636 | B2 * | 9/2017 | Jones | B01F 15/0416 |
| 2010/0308591 | A1 * | 12/2010 | Godfrey | F03B 13/00 |
| | | | | 290/54 |
| 2012/0048201 | A1 * | 3/2012 | Qian | A01K 5/0114 |
| | | | | 119/57.92 |

\* cited by examiner

FEEDING APPARATUS FOR ANIMALS

This invention relates to a feeding apparatus for animals in which feed material deposited through a duct under gravity acts to drive a feed activated engine that can be used to drive other mechanisms such as feed flow counters, solid or liquid dispensers, mixers and others.

The term "animal" as used herein is intended to include any farmed livestock including birds, fish, where there is provided at least one feeder with a feed duct through which the material is supplied.

BACKGROUND OF THE INVENTION

It is well known that feeding systems for animals particularly those contained within a barn include a series of feeders located at suitable positions within the barn is for receiving feed from a supply system ducting the feed to the individual feeders.

In some cases the animals or simply need a feed product which is the same product apply to each of the feeders. In other cases the animals may need a supplement or additive either for a limited period of time or for some only of the animals depending upon their condition.

The addition of supplements to the feed has raised some difficulties a temporary period of supply and for supply to selected ones of the animals.

SUMMARY OF THE INVENTION

It is an object of the present invention to provide a feeding system for animals which allows the ready addition of an additive material into the feed material to be supplied to a feed dispensing system to be taken by the animal.

According to the invention there is provided an apparatus for feeding animals comprising:

a feed supply duct for feeding at least one feed dispensing container at which at least one animal can take feed;

the feed supply duct being arranged such that the feed falls through the feed supply duct under gravity;

a drive member mounted at the duct and including a plurality of paddle blades of a wheel mounted for rotation about an axis of the wheel such that falling feed in the duct acts to drive the blades to rotate the wheel about the axis;

and a driven component driven by the wheel.

According to a second aspect of the invention there is provided an apparatus comprising:

a housing defining a duct passing therethrough;

couplings at a top and a bottom of the housing each arranged to connect to an end of a respective duct portion of a feed supply line;

a drive member mounted at the duct and including a plurality of paddle blades of a wheel mounted for rotation about an axis of the wheel such that falling feed in the duct acts to drive the blades to rotate the wheel about the axis;

and a driven component mounted on the housing driven by the wheel.

In accordance with a particularly preferred arrangement of the present invention there is provided a housing within which the wheel is mounted and the housing forms the duct with couplings at top and bottom of the housing to connect to supply duct portions in a supply line from a source of the feed to the dispensing container.

Preferably each of the paddle blades extends across the duct from an inner edge on one side of the duct to an outer edge at the duct where the outer edge has an outer peripheral shape in a view longitudinal of the duct which closely matches an inside surface of the duct and where each of the paddle blades has a shape is side elevational view at right angles to the duct which is curved outwardly of an axis of the wheel and in a rearward direction relative to movement of the feed through the duct. These two curvatures provide a complex shape of the blade bearing in mind that the rearward curvature is taken into account in the peripheral shape so that the peripheral shape passes through the duct in close proximity to the duct wall to prevent the feed material from flowing past the blade through the duct. In this way the blade in effect meters the material forwardly so that a certain volume of feed falling downwardly in the duct acts to drive the wheel through a certain angle of rotation.

Preferably the axis of the wheel is offset to one side of duct and is generally at right angles to the duct with the blades extending across the duct. In this way the duct portion defined in the structure itself can have the same dimensions as the duct portions above and below the structure.

In one embodiment the driven component comprises a simply counter which provides an output indicative of a number of turns of the wheel which is proportional to an amount of feed passing through the duct. In addition the counter can be used in combination with other driven components. The counter thus can be used to provide an indication of a volume of feed supplied to the particular feed distribution container or feeder. The counter can also be used to indicate that the system is blocked or for some reason the wheel is not being driven.

In a particularly important aspect the driven component preferably comprises a dispenser for feeding an additive material from a supply to an injection opening for addition to the feed passing through the duct. In this way the driven component can meter the additive material into the feed at a proscribed rate.

In one arrangement the dispenser is a liquid pump such as a peristaltic pump and the additive material is a liquid.

In another arrangement the dispenser is a particulate feed wheel arranged to meter a particulate material.

Whether the additive material is a liquid or a particulate, the additive material can be located in a replaceable supply cartridge which can be inserted into a receptacle on the housing of the device to supply the material to the metering system.

In this arrangement preferably the wheel and the dispenser are mounted in a common housing and both the receptacle for the cartridge of supply and the injection opening are located on the housing.

In order for the structure to provide a simple arrangement with few mechanical parts, preferably the additive material is shut off by simply removing the supply cartridge from the mounting. In addition preferably the rate of supply of the metered material is constant relative to the rates of rotation of the wheel so as to avoid adjustment systems. Typically a constant proportion of the additive material relative to the feed is an acceptable direction.

Preferably the supply cartridge includes a nozzle for dispensing liquid and the mounting or receptacle for the cartridge includes a cylindrical collar for receiving a cylindrical lower end of the cartridge and a tube into which the nozzle which extends axially from one end of the cartridge is inserted.

Preferably the collar is mounted on a bracket attached to an upper connector arranged for connection of the duct to a feed duct portion. In this way the caller is presented upwardly at the top of the housing to allow the cartridge to be inserted downwardly with the nozzle projecting into the tube.

In the arrangement for dispensing a particulate additive, preferably the mounting comprises a flared upwardly facing mouth into which a lower end of a cylindrical cartridge for the particulate material is inserted. The flared mouth is molded into a housing containing the wheel and the duct and communicates with the metering wheel between the flared mouth and the duct.

In accordance with another aspect of the invention, the apparatus as defined above can be used in conjunction with an apparatus for feeding animals comprising a feed dispensing container at which at least one animal can take feed, a supply source for supplying feed to said dispensing container and a supply line from a source of the feed to the dispensing container including separate duct portions.

The main difference we see in the arrangement as described herein is that the "feed activated engine" or wheel is driven using only feed gravity and it is not controlled or triggered by the mechanics or electronics of the feed conveying system.

The concept as described herein relates therefore to the provision of a feed activated engine that can be used to drive other mechanisms like feed flow counters, solid or liquid dispensers, mixers etc.

The main objective is to provide a simple mechanical system that does not depend on any electrical or electronic controls.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
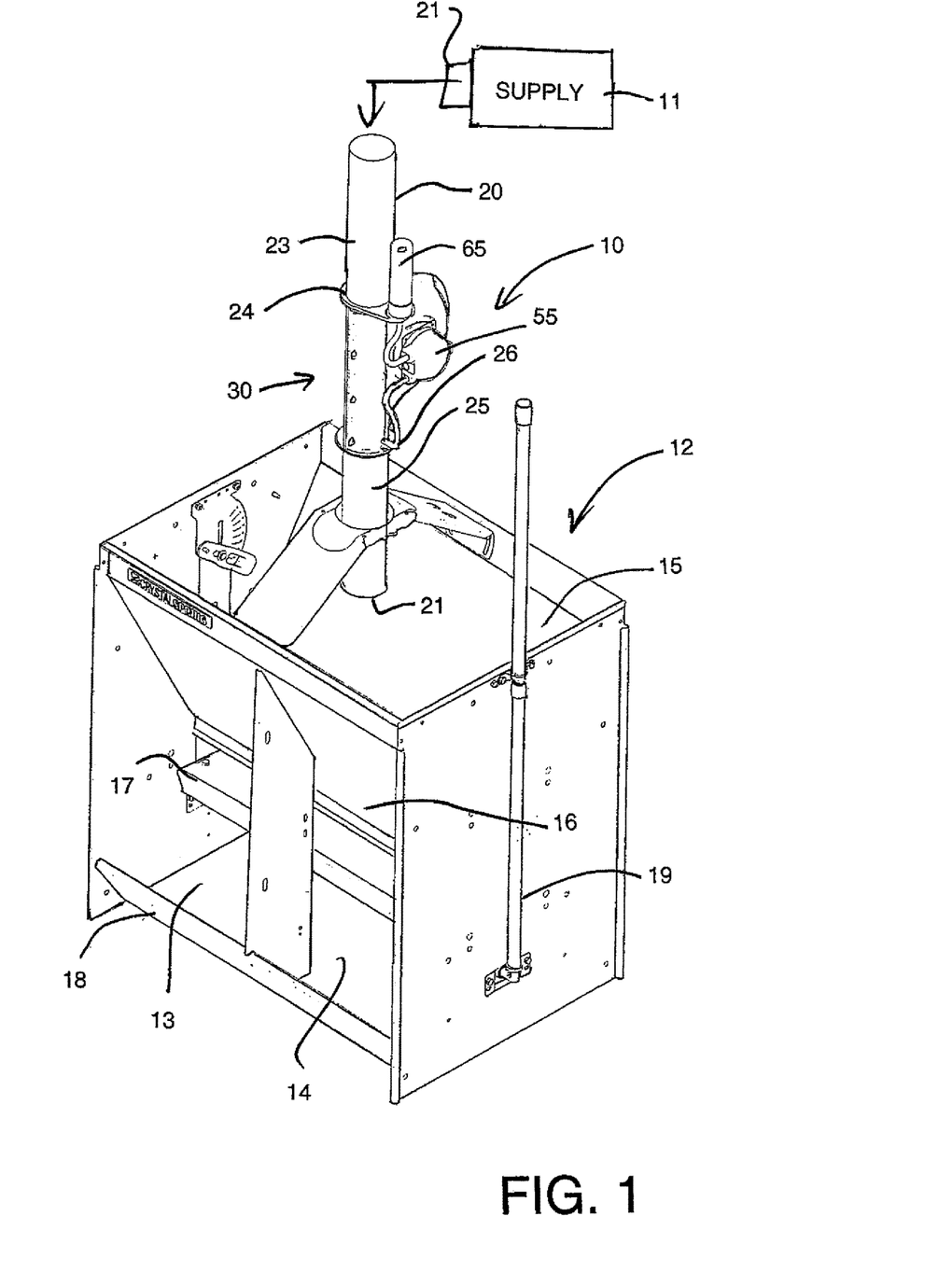
FIG. 1 is an isometric view of a feeder of a feeding apparatus including an additive metering system according to the present invention.
Figure 2:
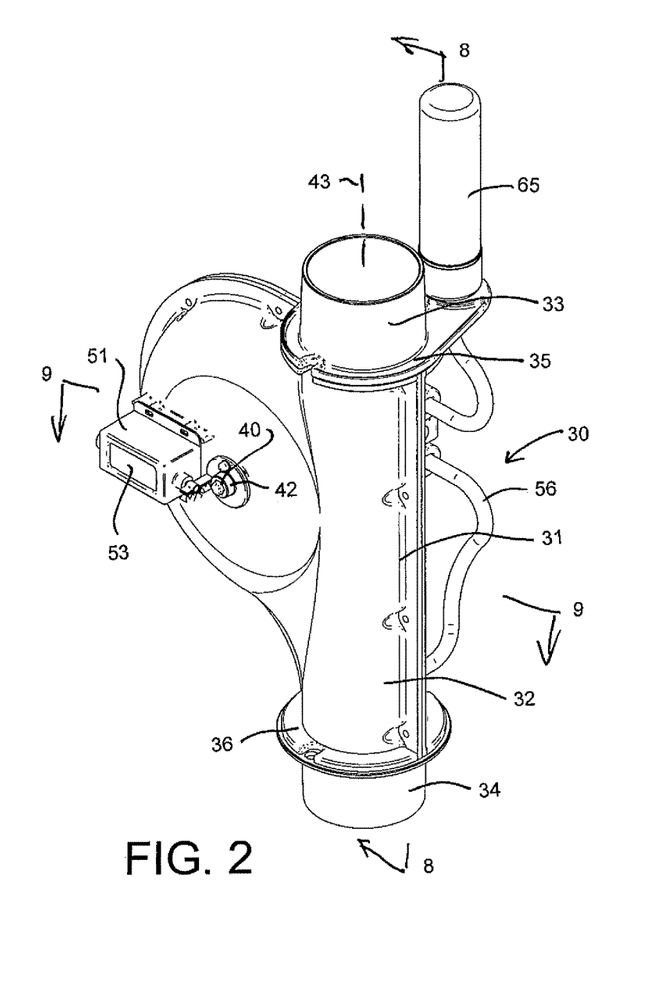
FIG. 2 is a first isometric view of the additive metering system of FIG. 1.

An apparatus 10 for feeding animals includes a supply 11 of feed material force applied to a series of individual feeders or feed dispensing systems generally indicated at 12 where the feed can be taken by one or more animals at the dispensing system 12.

In the example shown the feeder 12 is a double sided feeder with two compartments 13, 14 on each side allowing access to the feeder by four animals and simultaneously. In this example the feeder includes a hopper 15 which converges inwardly and downwardly to a bottom opening 16 where the opening discharges onto a shelf 17 located above a bottom trough 18. A water supply 19 is arranged to dispense water into the trough so that feed failing from the shelf's court in the trough and mixed with water from the supply 19. Feeders of this type are well-known and comprise only one example of the type of feeder which can be used.

Feed from the supply 11 passes through a vertical duct 20 so that the feed falls downwardly through the vertical duct 20 and an open mouth 21 at the bottom of the duct to allow the feed to enter the hopper 15. In some cases feed is supplied continually so that the hopper is maintained full with the position of the mouth 21 preventing overfeeding. In other cases the supply 11 includes a drive 22 which operates periodically the supply required volume of the feed into the hopper 15.

The vertical duct 20 includes an upper portion 23 with a bottom end 24 and the lower portion 25 with upper end 26. Between these two portions is provided a device 30 which includes the components to meter an additive into the feed material in the duct 20 depending upon the rate of movement of the feed within the duct.

The device 30 comprises a common housing 31 which defines a duct portion 32 terminating at an upper end with a collar 33 and at a lower end with a collar 34. A flange 35 on the bottom of the collar 33 is arranged for attachment to a similar flange at the bottom of the duct portion 23. Symmetrically a flange 36 at the top of the collar 34 is arranged for attachment to the duct portion 25. In this way the duct portion 32 defined by the housing is basically at the same cross-sectional shape on the area as the duct portions of 23 and 25 so that the material can flow smoothly through the duct intruding through the duct portion 31 of the housing 30. In this arrangement the ducts are cylindrical as is typical with ducts of this arrangement.

Figure 7:
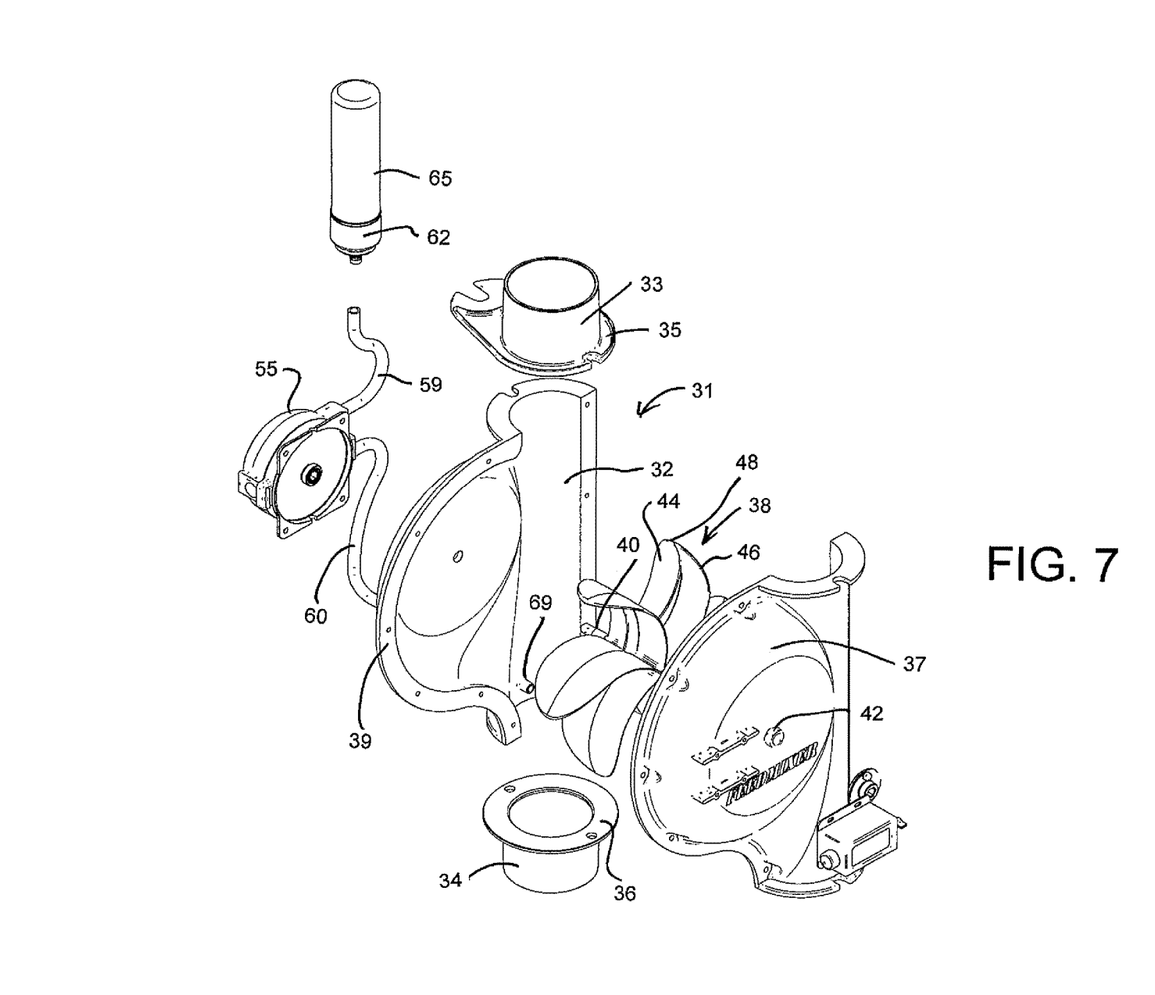
FIG. 7 is an exploded view of the additive metering system of FIG. 1.

The housing 31 further includes an enclosure 37 for a. As shown in FIG. 7 the housing 31 including the duct portion 32 and of the enclosure 37 is formed in two symmetrical opposing sections clamped together at a peripheral flange 39 to enclose the duct and the paddle wheel 38. The flanges 35 and 36 are clamped onto top and bottom portions of the peripheral flange 39 to form the housing structure for attachment to the feed duct to the feeder.

The paddle wheel 38 comprises an axle 40 carrying bushings 41 and 42 on respective sides of the enclosure 37. The axle 40 is offset to one side of the duct portion 32 and is arranged at right angles to a longitudinal axis 43 of the duct 32.

Figure 8:
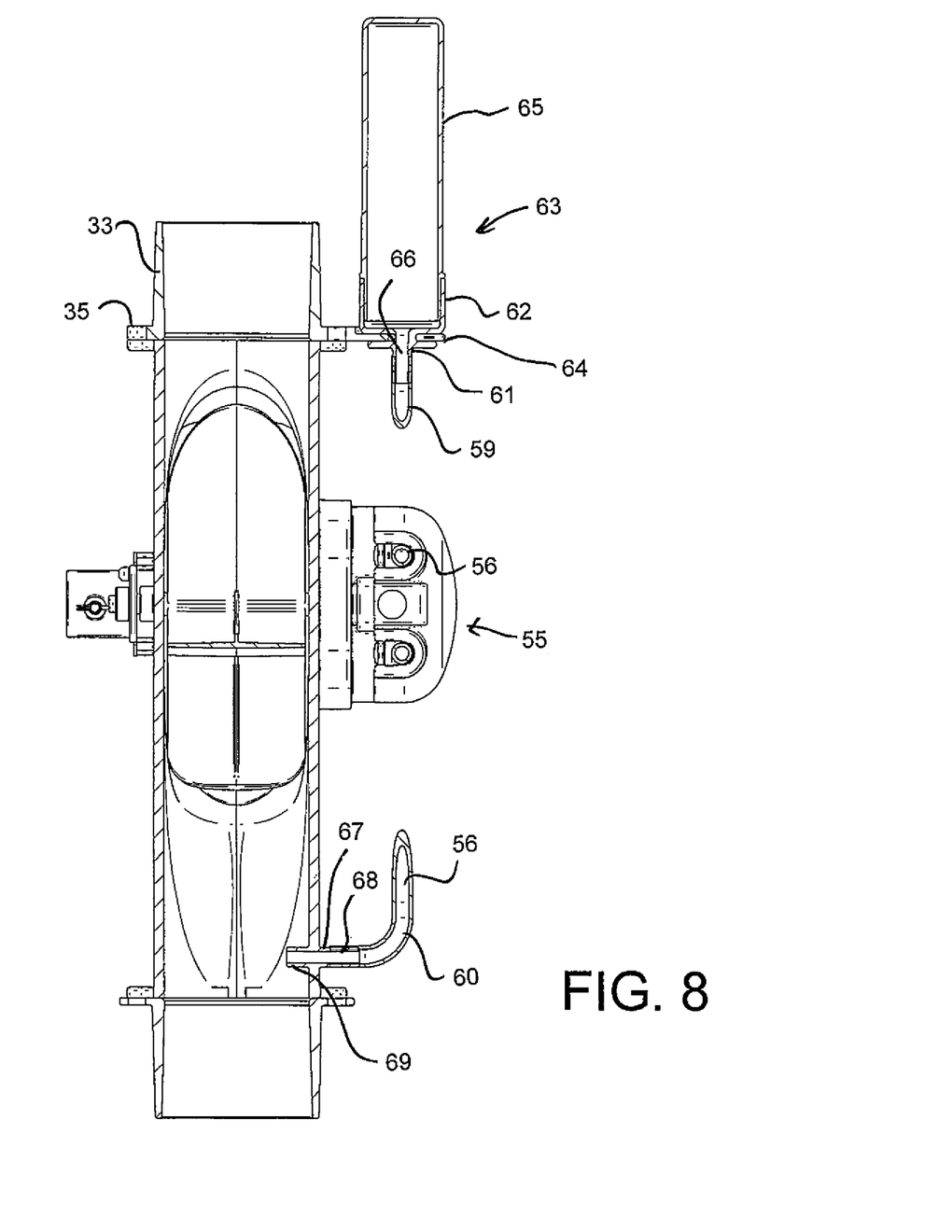
FIG. 8 is a cross-sectional view along the lines 8-8 of the additive metering system of FIG. 2.
Figure 9:
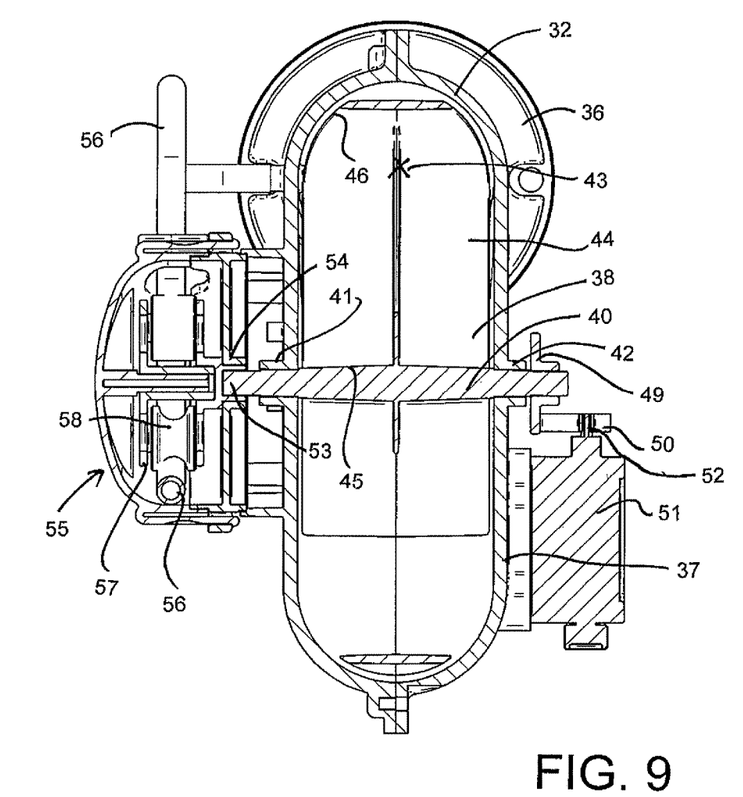
FIG. 9 is a cross-sectional view along the lines 9-9 of the additive metering system of FIG. 2.
Figure 10:
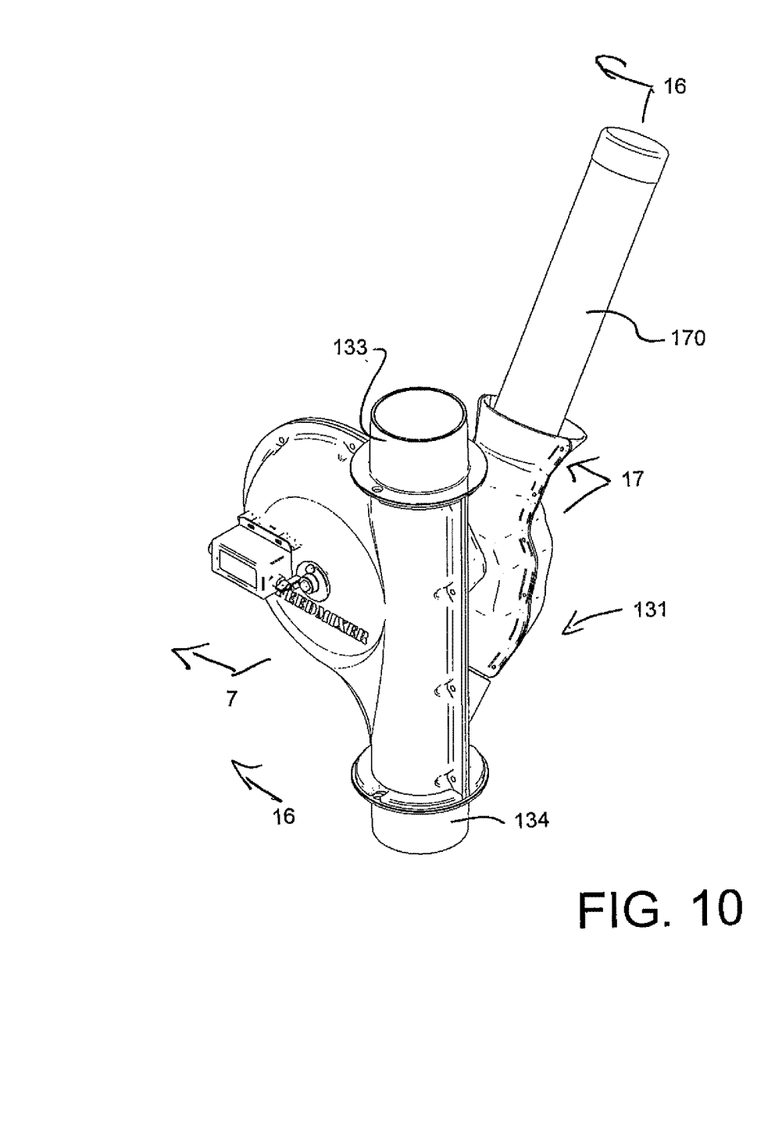
FIG. 10 is a first isometric view of a second embodiment of an additive metering system for use with the feeder of FIG. 1.
Figure 11:
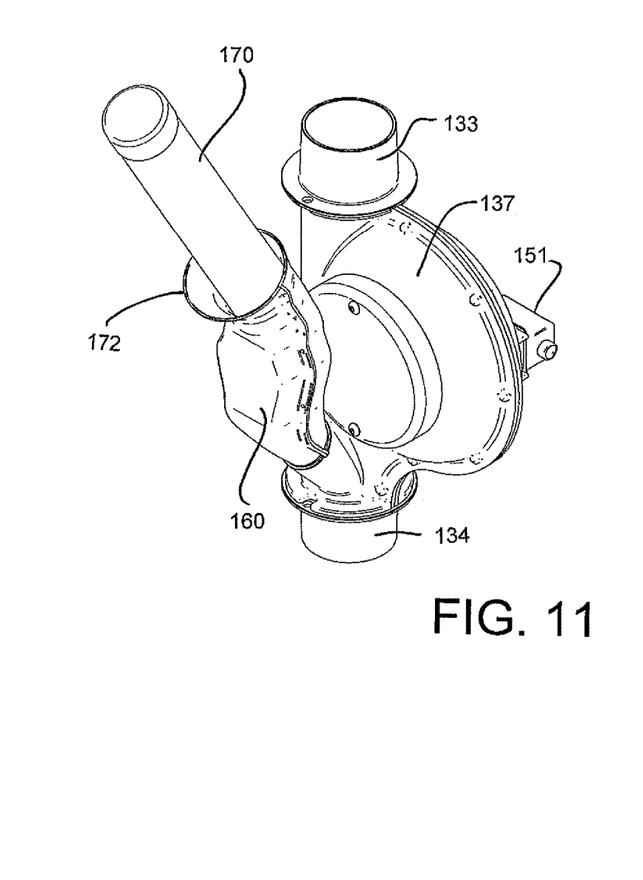
FIG. 11 is a second isometric view of the additive metering system of FIG. 10.
Figure 12:
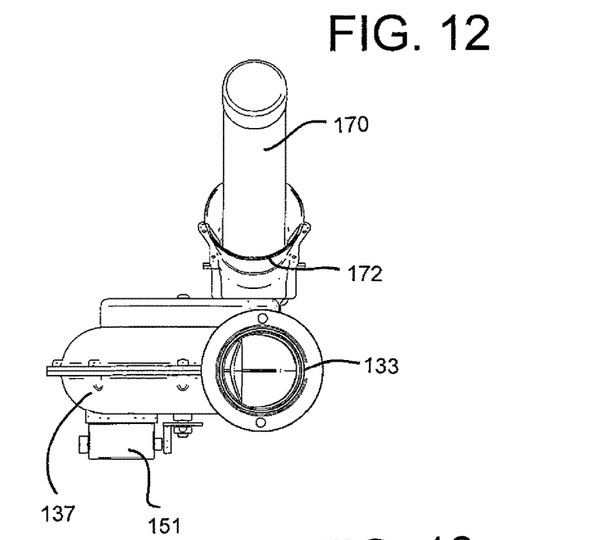
FIG. 12 is a top plan view of the additive metering system of FIG. 10.
Figure 13:
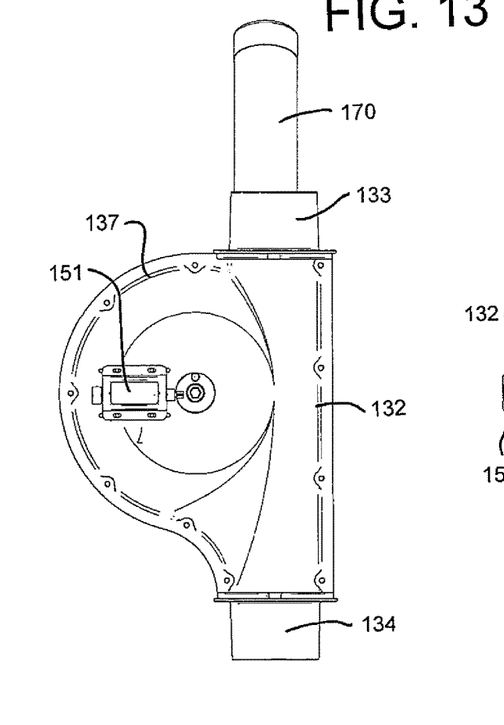
FIG. 13 is a side elevational view of the additive metering system of FIG. 10.
Figure 14:
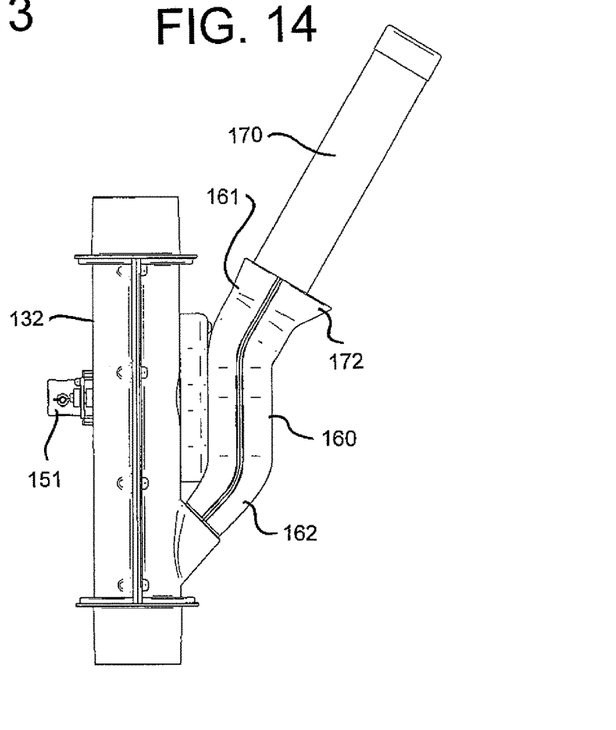
FIG. 14 is a front elevational view of the additive metering system of FIG. 10.
Figure 15:
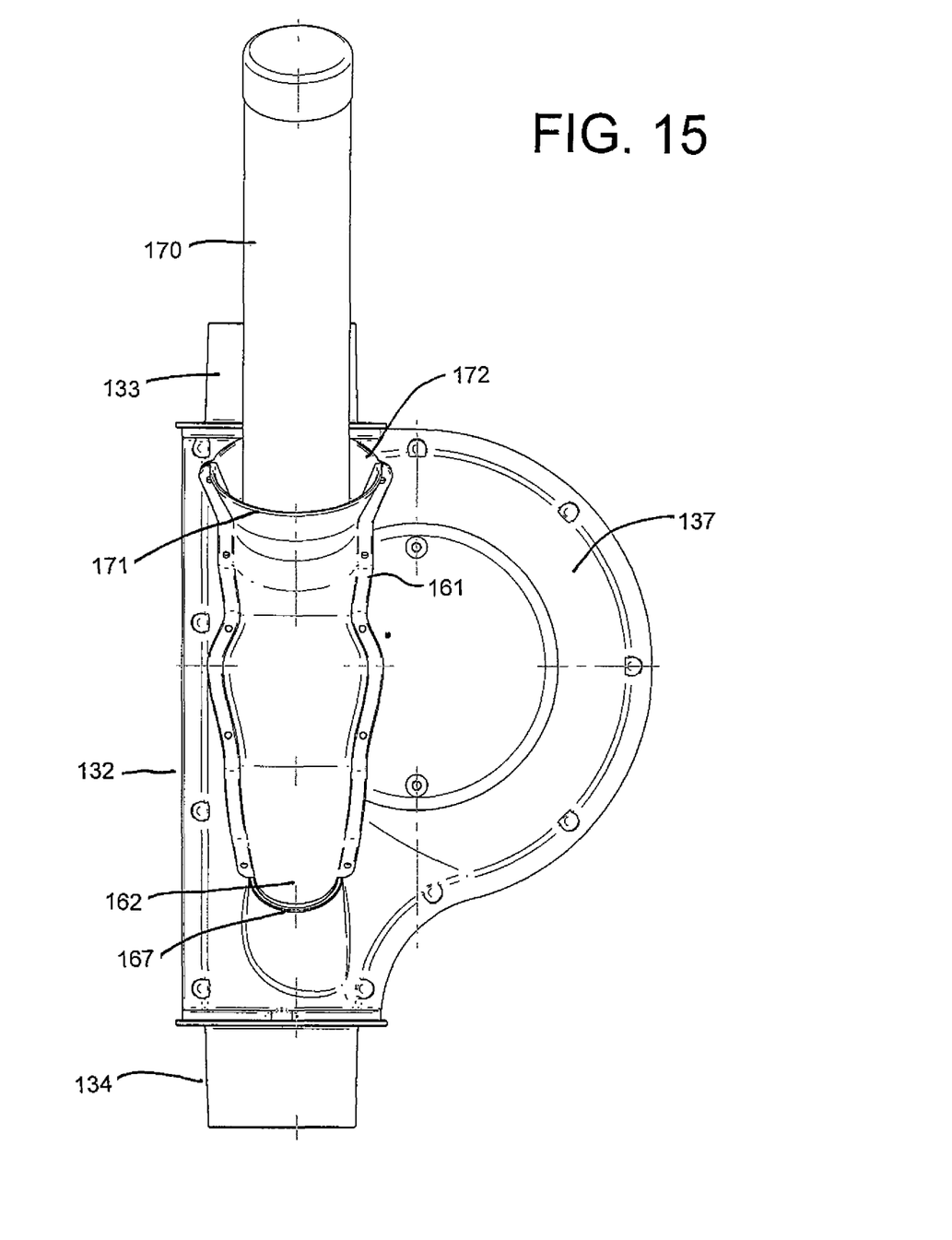
FIG. 15 is an opposed side elevational view of the additive metering system of FIG. 10.

As shown in FIGS. 7, 8 and 9, the paddle wheel 38 includes blades 44 which are arranged to extend across the duct from an inner edge 45 at the axle to an outer edge 46 of the blade which is located at the inside surface of the duct 32 as best shown in FIG. 9. The blade 44 as viewed inside elevational view are curved outwardly and rearwardly to a tip portion 46 located adjacent the inside surface of the duct 32. Assume the best in FIG. 9, the curvature of the blade is such that the outside edge 46 closely follows the inside surface of the duct 32. As the tip 48 of the outer edge 46 is curved rearwardly, it extends outwardly beyond a semicircle at the outer edge 46. That is, if the blade were directly radial, the outer edge would be semicircular. However because the blade is curved rearwardly tip 48 is more pointed so that the tip lies on a circle surrounding the axle 40 where the distance of the tip 48 from the axle is equal to the distance of the inside surface of the duct 32 from the axle 40.

In this way the feed material falling on the gravity through the duct 32 drops on to a respective one of the blades 44 which is placed across the duct so that the feed is prevented from passing through the duct without engaging the respective blade and rotating that blade in the forward direction opposite to the rearward curvature of the blade. In this way the blades act so that the rotation of the axle 40 is proportional to the amount of feed passing the wheel through the duct 32.

As best shown in FIG. 9, the axle 40 carries at one end a sprocket 49 which drives a wheel 50 of a counter 51. The sprocket 49 rotates around the axis of the axle 40 and the wheel 50 is arranged at right angles to the axle so as to drive a shaft 52 which provides an input into the counter 51. The counter 51 has a display 53 so as to indicate to a user a number indicative of the rotation of the wheel and so as to indicate to the user a situation where the wheel is for some reason not rotating due to a blockage or breakage.

At the other end of the axle 40 is provided a splined drive member 53 which provides a drive to and input gear 54 causing rotation of a peristaltic pump 55. The peristaltic pump is of a conventional construction including a tube 56 which wraps around a wheel 57 on which the rollers 58 roll so as to squeeze the tube around the wheel 57 to force liquid forwardly in the tube from a feed end 59 of the tube to a discharge end 60 of the tube. The peristaltic pump 55 therefore acts to pump forwardly a positive volume of liquid which is directly proportional to the rotation of the axle 40. The direct connection therefore between the axle 40 and the peristaltic pump ensures that the rate of pumping of the liquid is directly proportional to the rate of rotation of the wheel and therefore to the rate of movement of the feed.

The counter 51 is located on one side of the enclosure 37 and the peristaltic pump 55 is mounted on the opposite side of the enclosure 37 at opposite ends of the axle 40.

Figure 3:
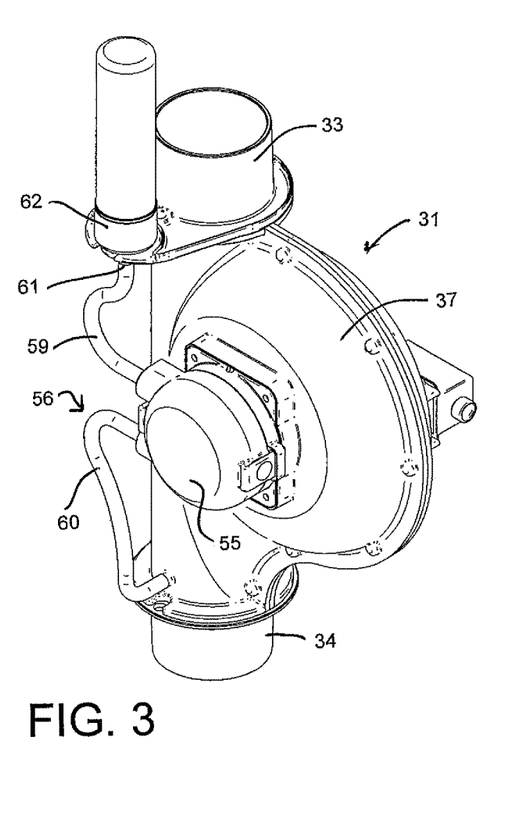
FIG. 3 is a second isometric view of the additive metering system of FIG. 1.
Figure 4:
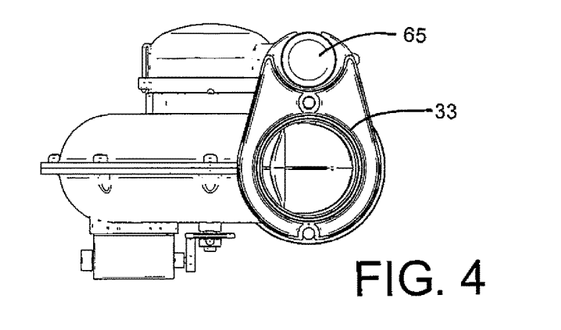
FIG. 4 is a top plan view of the additive metering system of FIG. 1.
Figure 5:
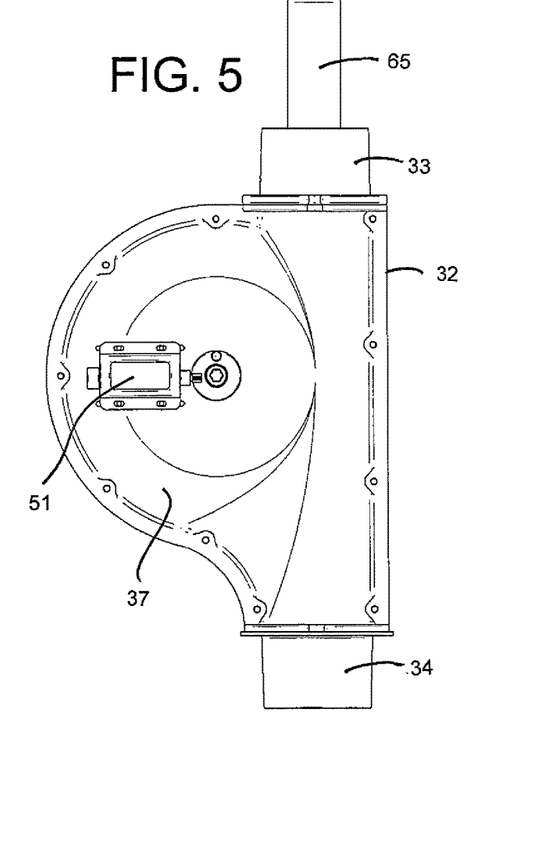
FIG. 5 is a side elevational view of the additive metering system of FIG. 1.
Figure 6:
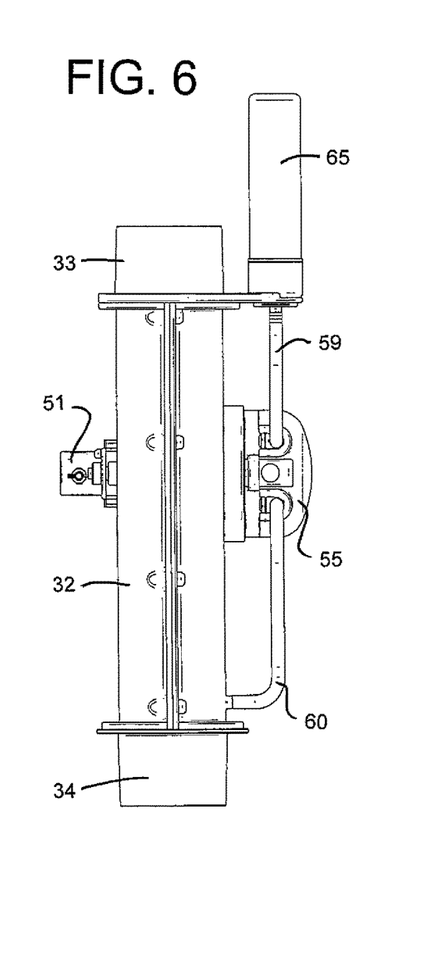
FIG. 6 is a front elevational view of the additive metering system of FIG. 1.

As shown in FIG. 3, the feed end of 59 of the tube is connected to a nipple 61 of a receptacle 62 for injection of the liquid from a supply generally indicated at 63. The receptacle 62 forms a cylindrical receiver portion two which is connected to nipple 61 projecting downwardly through a bracket 64 attached to the flange 35. The bracket 64 bus projects outwardly to one side of the duct to a position generally aligned with the pump 55. The cylindrical receiver portion of the receptacle 62 is arranged to receive the bottom end of a cylindrical container 65 forming the supply 63. Thus the container 65 comprises a simple cylindrical body with a nozzle 66 at the lower end. In this way the supply is provided as a readily portable cartridge member which can be carried to the device and inserted into place at the bracket 64 by placing the lower end of the cartridge into the receptacle 62 with the nozzle 66 projecting into the nipple 61 to be retained in place. This insertion can generally occur without the escape of liquid until the pumping action occurs which extracts the liquid from the cartridge 65 and feed it through the tube 56 to the lower feed end 60 of the tube.

The lower feed end is attached to an injection port 67 mounted on the housing 31 at the side of the duct 32. The injection port 67 includes a sleeve and 68 onto which the tube 56 is attached and a projecting end 69 which projects slightly into the duct so as to direct the liquid away from the wall of the duct and into the feed material within the duct. In this way the liquid supply is formed as an integral part of the device with the supply being carried on the housing and the injection nozzle 69 forming part of the housing.

Now turning to the arrangement shown in FIGS. 10 to 17, a construction is provided which allows the supply of a particulate material in replacement for the liquid of the embodiment previously described. The construction of some includes a housing 131 including the top and bottom sleeves 133 and 134 together with the enclosure 137 and the wheel 138. As previously described the wheel 138 includes an axle 140 which provides drive to the counter 151 and to a pump mechanism. In this embodiment the pump 55 is replaced by a particulate feed mechanism 155.

Figure 16:
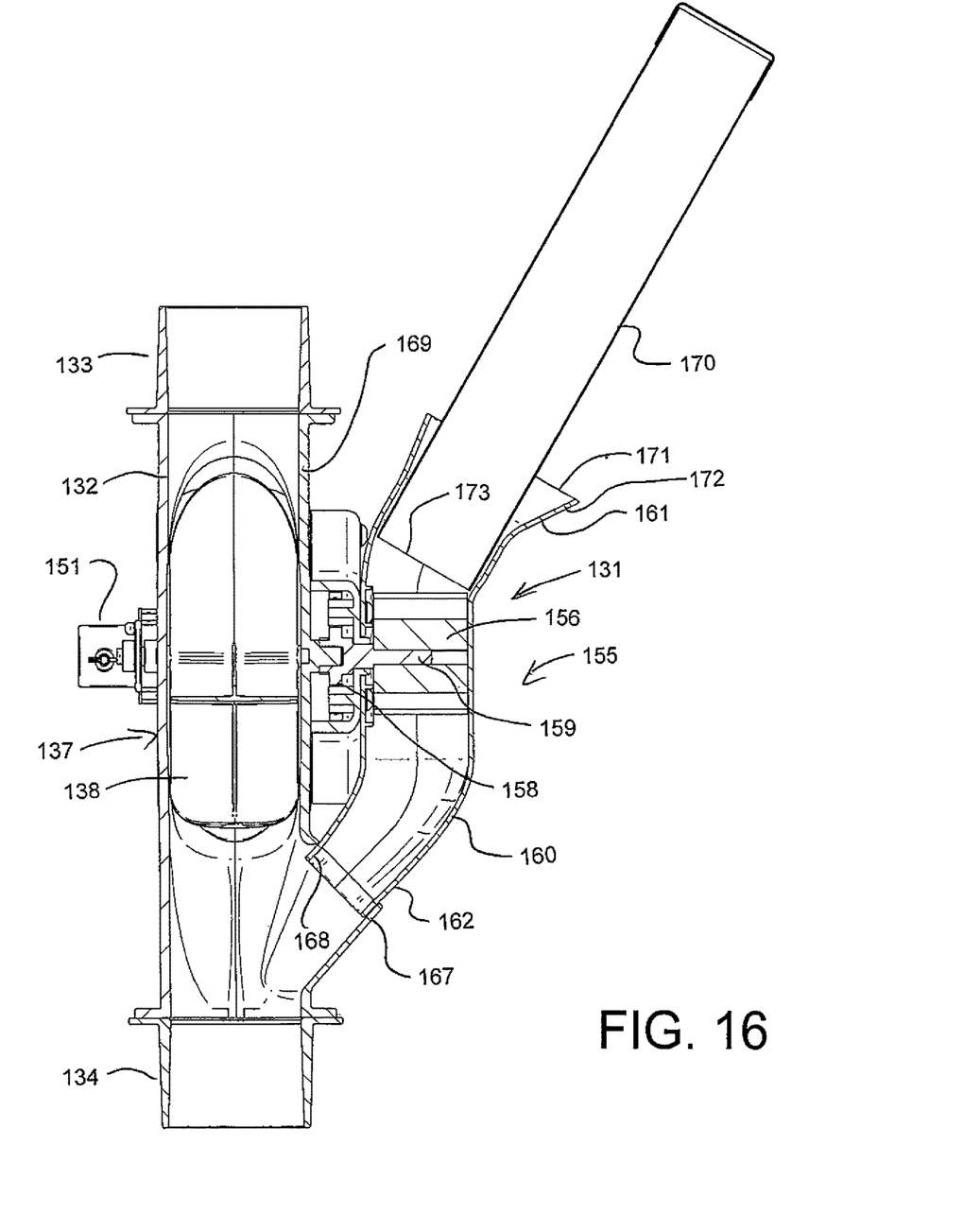
FIG. 16 is a cross-sectional view along the lines 16-16 of the additive metering system of FIG. 10.
Figure 17:
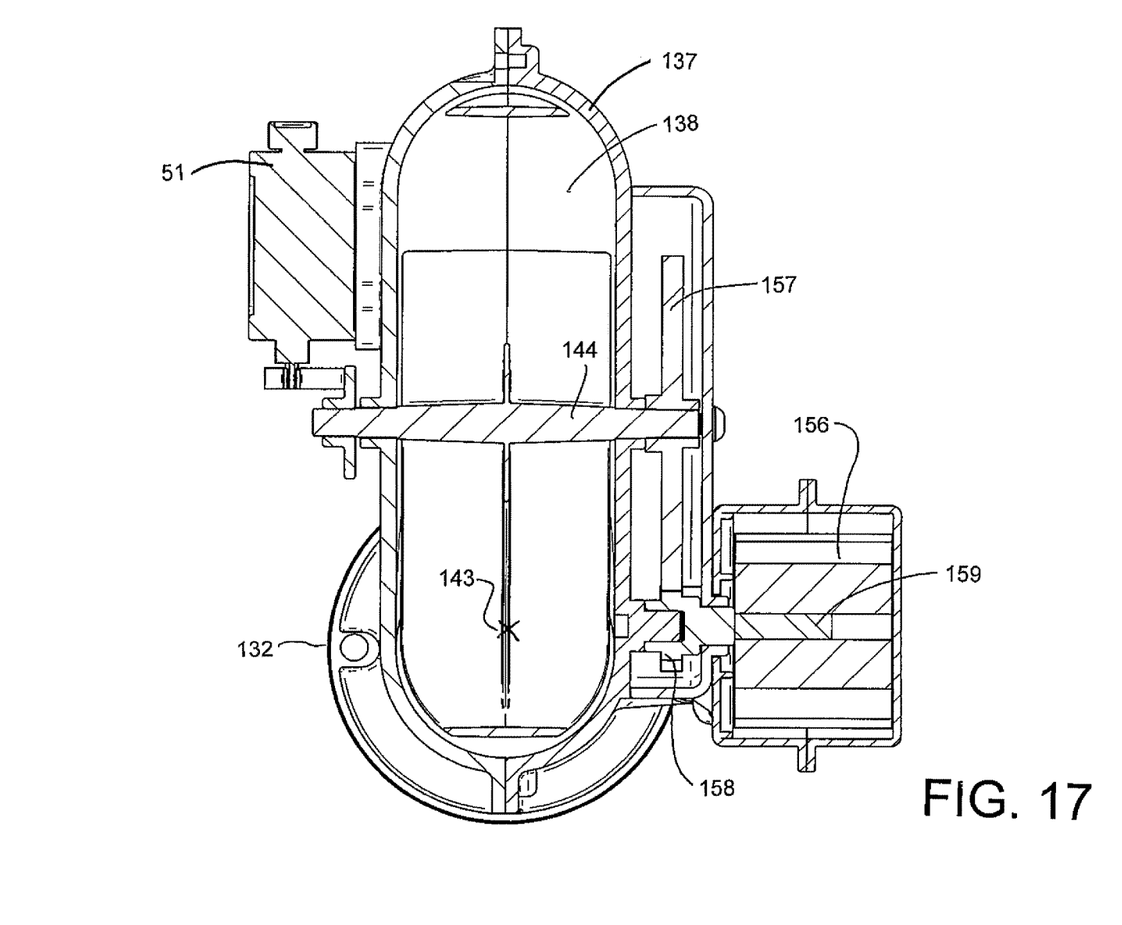
FIG. 17 is a cross-sectional view along the lines 17-17 of the additive metering system of FIG. 10.

As best shown in FIG. 16, the particulate feed mechanism 155 includes a wheel 156 driven from the axle 144 of the wheel 138. At the end of the axle 144 is a drive gear 157 rotating about the axis of the axle 144 and acting to drive a sprocket 158 mounted on an axle 159 of the wheel 156. As shown in FIG. 17 the diameter of the wheel 157 is such that the axle 159 is aligned substantially with the axis 143 of the duct 132. The wheel 156 is mounted in a channel 160 extending from a feed end 1612 a discharge end 162. In this embodiment the duct 132 has the inlet 167 arranged to receive a particulate material rather than liquid as in the previous embodiment. Both the inlet 167 is of a width approximately equal to the width of the channel and is inclined downwardly and inwardly into the duct 132. The inlet 167 provides a mouth receiving a cylindrical end portion 168 of the channel 160 so that the particulate material in the channel can flow smoothly from the channel into the duct 132 where the additive particulate material mixes with the feed in the duct.

The channel 160 is located at a spaced position from a side wall 169 of the enclosure 137 so that the mechanism for driving the wheel 156 is positioned between the channel and the enclosure and so that the feed end 161 is presented in a readily available manner to the user for insertion of a cartridge 170. The feed end 161 is flared to form a wider open mouth 171 with a lower lip 172 over which a bottom edge 173 of the cartridge can be inserted. Thus an open cartridge containing the particulate material can be inserted by a user simply by moving the mouth of the cartridge toward the flared mouth of the opening and placed over the lip 172 to insert the cartridge and invert the cartridge so that it stands upwardly from the feed end 161 to discharge the particular material into the channel.

As previously described in respect of the liquid supply pump, the paddlewheel 138 asked to drive the feed wheel 156 at a rotation rate proportional to the rate of feed material passing through the duct 132 thus metering the particulate material from the cartridge 170 into the channel 160 and through the opening 167 into the duct 132. The rate of addition of the particulate material is therefore directly proportional to the rate of passage of the feed material.

As previously described, the components driven by the wheel 138 include the counter 151 together with the metering system for the additive material. In some embodiments, the wheel 138 can be used simply to drive a counter. In other embodiments the counter can be omitted and the wheel can be used simply to drive the metering system for the additive material.

In order to halt the supply of the additive material, the user can simply remove the cartridge from its position by pulling it from the open mouth and returning the cartridge to its upright position for subsequent use of the remaining material. In this way the user can readily control the supply of the additive material for a specified period or for selected ones of the feeders.

The construction is readily mounted within existing feed ducts simply by attaching the housing between two duct components. The device is driven and operated solely by the movement of the feed material and requires no power supply nor any control components.

The invention claimed is:

1. An apparatus for feeding animals comprising:
   a feed dispensing system;
   a plurality of feed dispensing containers at each of which at least one animal can take feed material;
   each of said plurality of feed dispensing containers comprising: a respective upstanding feed supply duct portion connected to the feed dispensing system so as to receive feed therefrom;
   the respective feed supply duct portion being configured so that feed therein from the feed dispensing system falls by gravity to the respective feed dispensing container;
   a rotary drive member mounted at the duct portion and including a plurality of paddle blades of a paddle wheel mounted for rotation about an axis of the wheel such that falling feed in the duct acts to drive the paddle blades to rotate the wheel about the axis;
   a dispensing container containing a particulate additive material mounted on one side of the duct portion;
   a feed wheel at the dispensing container driven by the paddle wheel which meters particulate additive material from the dispensing container to an outlet thereof which is arranged to discharge into the feed duct portion to mix with the feed therein.

2. The apparatus according to claim 1 wherein there is provided a housing within which the wheel is mounted and wherein the housing forms the duct with couplings at top and bottom of the housing to connect to supply duct portions in a supply line from a source of the feed to the dispensing container.

3. The apparatus according to claim 1 wherein each of the paddle blades extends across the duct portion from an inner edge on one side of the duct to an outer edge at the duct portion where the outer edge has an outer peripheral shape in a view longitudinal of the duct portion which closely matches an inside surface of the duct portion and where each of the paddle blades has a shape in a side elevational view at right angles to the duct portion which is curved outwardly of an axis of the wheel and in a rearward direction relative to movement of the feed through the duct portion.

4. The apparatus according to claim 1 wherein the axis of the wheel is offset to one side of duct portion and is generally at right angles to the duct portion.

5. The apparatus according to claim 1 wherein the dispensing container comprises a replaceable supply cartridge.

6. The apparatus according to claim 1 wherein the paddle wheel, the duct portion and the dispensing container comprise a common housing.

7. The apparatus according to claim 6 wherein the common housing includes a mounting for a supply cartridge of the particulate additive material.

8. The apparatus according to claim 7 wherein a flow of the particulate additive material is shut off by removing the supply cartridge from the mounting.

9. The apparatus according to claim 7 wherein the mounting comprises a flared upwardly facing cylindrical mouth into which a cylindrical lower end of the supply cartridge for the particulate additive material is inserted.

10. The apparatus according to claim 9 wherein the flared mouth is arranged such that the supply cartridge is supported in a direction inclined upwardly and outwardly from one side of the duct portion.

* * * * *